United States Patent [19]

Besic et al.

[11] Patent Number: 4,762,051
[45] Date of Patent: Aug. 9, 1988

[54] SINGLE ACTING PUMP WITH DOUBLE ACTING DRIVE

[75] Inventors: Dragan Besic, West Caldwell; Wilbur C. Smith, N. Caldwell, both of N.J.

[73] Assignee: Dresser Industries, Inc., Dallas, Tex.

[21] Appl. No.: 886,460

[22] Filed: Jul. 17, 1986

[51] Int. Cl.⁴ .................... F04B 39/02; F04B 23/06; F16C 23/02
[52] U.S. Cl. ................. 92/165 R; 184/5; 417/534; 74/44
[58] Field of Search .......... 184/5; 92/165 R; 417/534–536; 74/44

[56] References Cited

U.S. PATENT DOCUMENTS

| 1,419,457 | 6/1922  | Joyner ........................... 384/11   |
| 1,743,908 | 1/1930  | Anderson ..................... 92/165 R    |
| 2,331,513 | 10/1943 | Stahl ............................. 417/539 |
| 2,771,037 | 11/1956 | Johnston ...................... 417/536    |
| 3,616,701 | 11/1971 | Decker et al. ................ 184/5       |
| 3,779,088 | 12/1973 | Miller ............................ 74/44   |
| 4,477,237 | 10/1984 | Grable ........................ 417/539    |

FOREIGN PATENT DOCUMENTS 2558960  2/1977  Fed. Rep. of Germany ...... 417/537
954234   12/1949 France .......................... 417/536
340982   of 1904 United Kingdom .......... 417/536
710038   6/1954  United Kingdom .......... 384/11

Primary Examiner—William L. Freeh

[57] ABSTRACT

A pump assembly (10) is disclosed which incorporates a double acting power end (12) to operate opposed single or double acting pumps (84, 102). First and second crossheads (30, 64) are reciprocated along the pumping axis (38) by rotation of the crankshaft (20) within the power end (12). A single acting pump is connected to each of the crossheads so that the pumping stroke of the pumps occur in opposite directions as the crossheads are reciprocated. This provides a constant loading of the power end in compression to most efficiently use the power end while realizing the advantages of using single acting pumps. The crossheads are guided for motion along the pumping axis by adjustable cradles (40, 46, 70, 72) which are initially secured to the frame of the pump assembly for limited motion and the crossheads reciprocated through their range of motion to align the cradles with the crossheads and subsequently rigidly secure the frame in the aligned positions as by fastening assemblies (52).

3 Claims, 2 Drawing Sheets

SINGLE ACTING PUMP WITH DOUBLE ACTING DRIVE

TECHNICAL FIELD

This invention relates to the pumping of material, for example coal slurry, by the use of a double ended reciprocating drive mechanism coupled at each end to a single acting pump.

BACKGROUND OF THE INVENTION

There are frequent applications for use of pumps to transport fluids or mixtures of fluids and solids. One such application is coal slurry transport. Because of the difficulty of pumping large quantities of fluid or fluid and solid mixtures, special pumps have been designed which are capable of surviving the high stresses of such pumping. One such pump design is disclosed in U.S. Pat. No. 3,779,088 to Miller, issued on Dec. 18, 1973.

In designing such a pump, a number of factors are critical. First, the initial cost of the pump must be considered. The physical size of the pump is critical, particularly when the pump is to be used in a confined space. The cost of maintenance is also of great concern and is balanced against the initial cost. Also, the nature of the material being pumped can create great pulsation forces within the pump which can lead to damage unless efforts are made to reduce this pulsation action. While previous pump designs have attempted to optimize all of these features, a need still exists for the development of an improved pump design which better meets all of these design requirements.

SUMMARY OF THE INVENTION

In accordance with one aspect of the present invention, a pump assembly is provided. The assembly includes a frame and a crankshaft mounted for rotation in the frame about a drive axis, the crankshaft having a throw. A connecting rod is mounted on the crankshaft throw at one end thereof and a first crosshead is pivotally mounted on the connecting rod at the other end thereof. The frame mounts first crosshead guides for confining motion of the first crosshead along a first pumping direction as the crankshaft is rotated. A second crosshead is positioned on the side of the drive axis opposite the first crosshead and is guided by second crosshead guides in the frame for motion along the first pumping direction. Transfer structure connects the first and second crossheads for joint motion. A first single acting pump is operably connected to the first crosshead and a second single acting pump is operably connected to the second crosshead. The pumping strokes of the pumps are staggered to provide a continuous load on the crankshaft as it rotates.

In accordance with another aspect of the present invention, a crosshead guide assembly is provided for use in guiding a crosshead in a pump assembly along a axis of reciprocation as the crosshead is reciprocated by a power unit. The crosshead has opposed cylindrical bearing surfaces. The crosshead guide assembly includes first and second crosshead cradles mounted on the frame of the pump assembly on opposite sides of the axis of reciprocation for supporting the bearing surfaces of the crosshead as it reciprocates. Structure is provided for initially permitting limited movement of the cradles relative to the frame to align the cradles with the crosshead by reciprocating the crosshead through its range of motion and subsequently securing the cradles rigidly to the frames in the aligned position.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
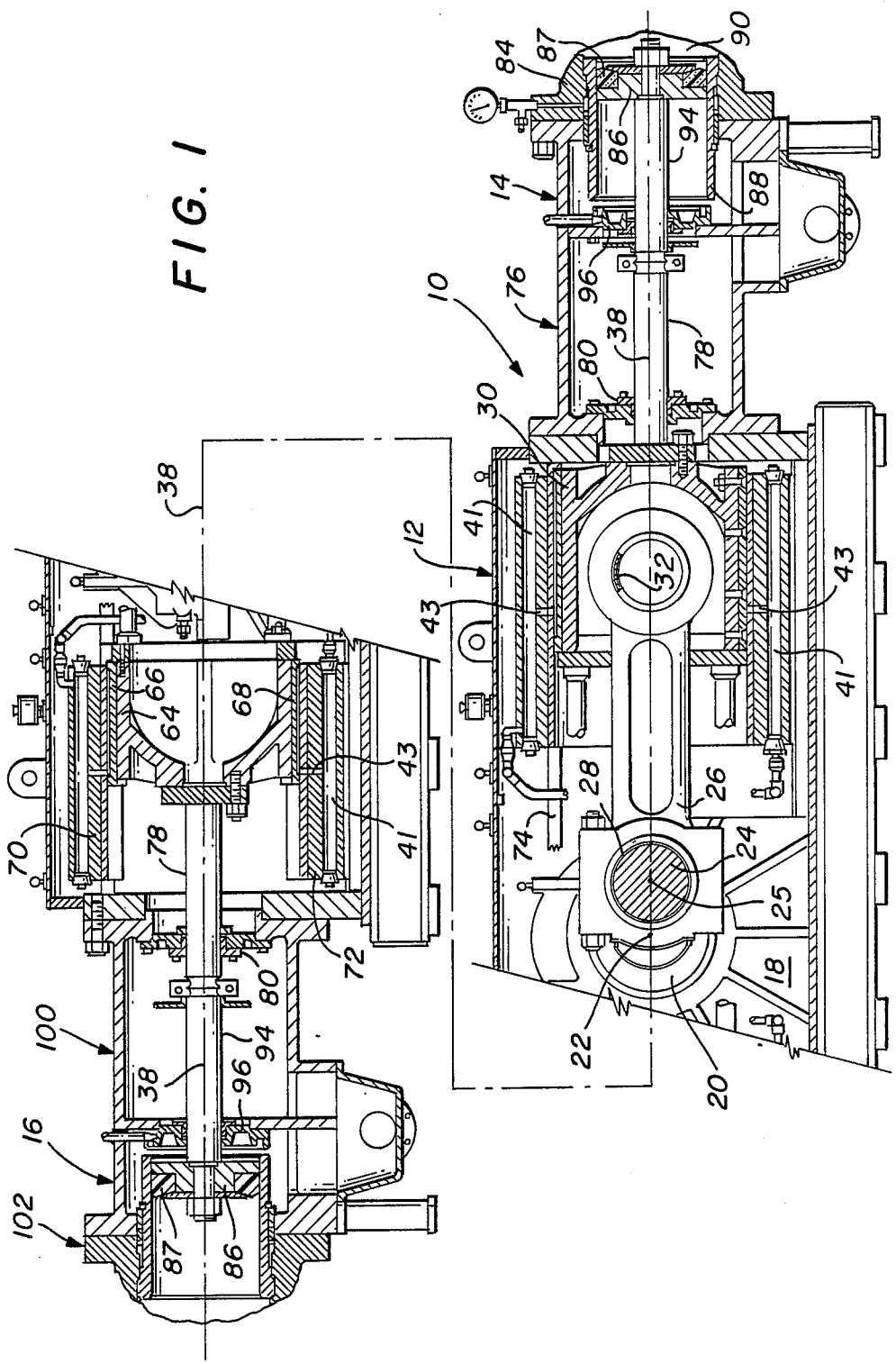
FIG. 1 illustrates a cross-sectional view of a pump assembly forming a first embodiment of the present invention.

Referring now to the Drawings, wherein like reference characters designate like or corresponding parts throughout the several views, FIG. 1 illustrates a cross-sectional view of a pump assembly 10 forming a first embodiment of the present invention. The pump assembly 10 includes a power end 12 which drives a first pumping end 14 on one side of power end 12 and a second pumping end 16 on the opposite side of power end 12 to pump fluids which can include a high solids content. One specific application of pump assembly 10 is the pumping of coal slurry. As will be described in greater detail hereinafter, the pump assembly 10 has significant advantages in using dual single acting pumps whose power strokes are staggered such that a continuous load is exerted by the power end 12 to maximize the efficiency of power input while utilizing the significant advantages of single acting pumps.

The power end 12 is provided with a frame 18 which mounts crankshaft 20 for rotation about the drive axis 22. The crankshaft 20 has a single throw 24 with an axis 25.

Connecting rod 26 is mounted on the crank throw 24 in a conventional manner through bearings 28. The opposite end of the connecting rod 26 extends into a first crosshead 30 and is pivotally attached thereto through bearings 32.

Figure 2:
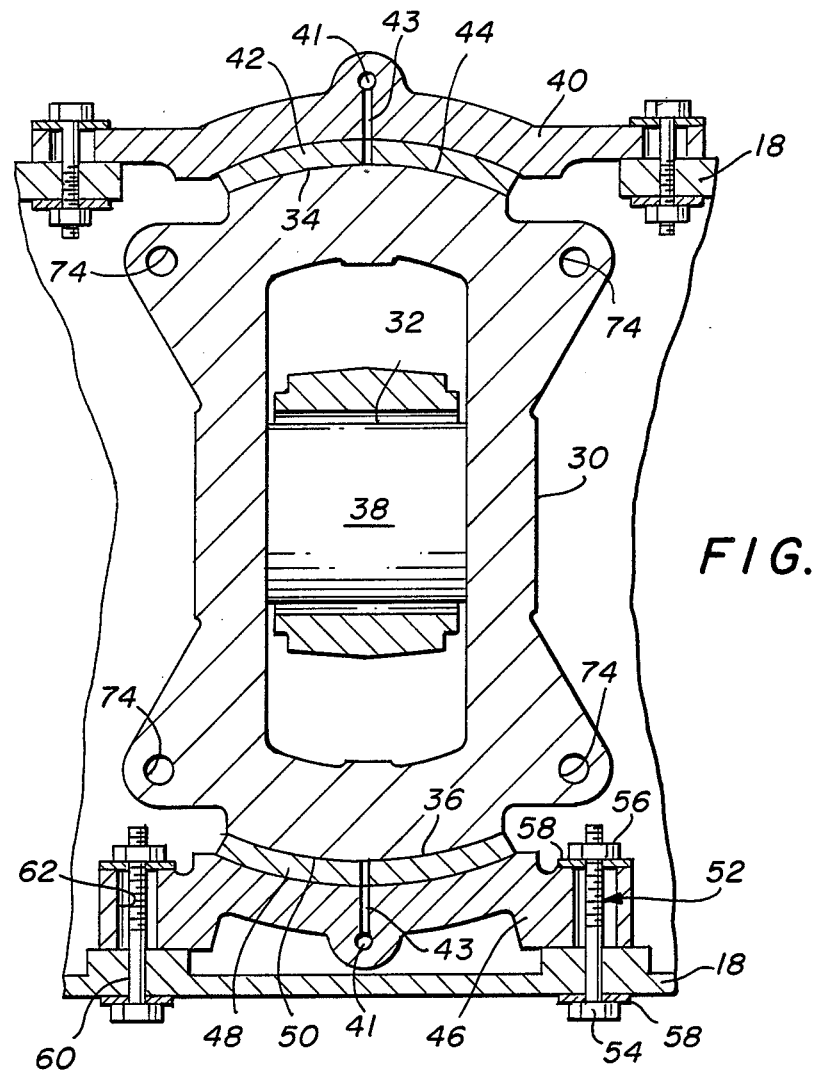
FIG. 2 is a cutaway view of the pump assembly illustrating a crosshead and the alignable crosshead cradles.

As best seen in FIG. 2, the first crosshead 30 has opposed bearing surfaces 34 and 36 which lie on a hypothetical cylinder of uniform radius about the central axis of symmetry of the crosshead 30, which corresponds with the pumping axis 38. An upper cradle 40 is mounted to the frame 18 and has a crosshead way 42 forming a wear surface 44 to contact the bearing surface 34 of the first crosshead 30. A similar lower cradle 46 is mounted on the frame 18 and is provided with crosshead way 48 defining a wear surface 50 for contact with the bearing surface 36 of the first crosshead 30. The function of the upper and lower cradles 40 and 46 is to guide the first crosshead 30 in reciprocal motion along the pumping axis 38 as the crankshaft 20 is rotated. Lubrication is provided through oil ways 41 and passages 43 from a source of pressurized lubricate to lubricate between the bearing and wear surfaces.

Figure 3:
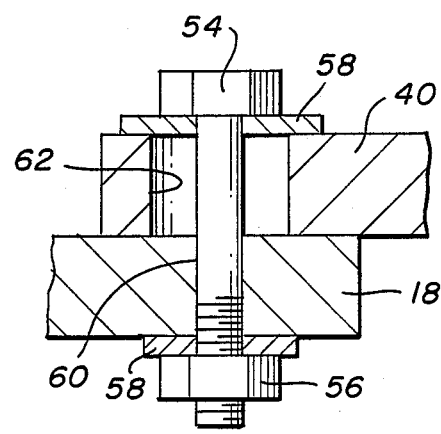
FIG. 3 is an illustrative view of one technique for securing a cradle to the pump frame.

As will be best seen with reference to FIGS. 2 and 3, the cradles 40 and 46 are secured to the frame 18 through a plurality of fastener assemblies 52 including bolts 54, nuts 56 and washers 58. The apertures 60 through the frame 18 generally correspond in diameter to the diameter of bolts 54. However, the aperture 62 in the cradles 40 and 46 are larger in diameter than the bolts 54 to permit limited motion of the cradles relative to the frame prior to tightening the nuts 56 on bolts 54 to rigidly secure the cradles to the frame.

This structure provides a very effective technique for ensuring that the cradles 40 and 46 are aligned with the first crosshead 30. The first crosshead 30 is moved through the entire length of its reciprocating stroke by rotating the crankshaft 20 with nuts loosened on bolts 54 (preferably with no load on the drive). This causes the first crosshead 30 to align the cradles with the true operating direction of the power end. Once the alignment has been made, the nuts 56 can then be tightened on bolts 54 to rigidly secure the cradles on the frame 18 in true running alignment. The self-aligning of the cradles thus compensates for any machining tolerances, installation and/or stress relief distortions. Furthermore, this technique avoids the necessity of accurate circular boring of large diameter ways in the frame itself which has been required in previous designs. Additionally, shorter frames and shorter, stiffer crankshafts can be used with this design.

The permissible range of motion of the cradles on the frame is designed to accommodate any anticipated misalignment. Once the alignment is accomplished, the cradles can be permanently located in this relationship on the frame by any means, including doweling, welding, torquing the nuts 56 on bolts 54 or any other suitable fastening structure.

With reference to FIG. 1, a second crosshead 64 is supported by frame 18 for reciprocation along the pumping axis 38 on the opposite side of the drive axis 22 from the first crosshead. The second crosshead 64 is also provided with bearing surfaces 66 and 68 which lie on the surface of a hypothetical cylinder centered on the pumping axis of the same radius as surfaces 34 and 36. The second crosshead 64 is also guided for reciprocation by an upper cradle 70 and a lower cradle 72 which are adjustably secured onto the frame 18 with fastener assemblies 52 to allow the alignment of the second crosshead as done with cradles 40 and 46 for the first crosshead 30. The crosshead 64 is reciprocated by the crankshaft through the first crosshead 30 by rigidly connecting the crossheads together by transfer rods 74. The rods are positioned on the crossheads so that they will not interfere with the crankshaft as the crankshaft is rotated. As will be apparent from the figures, as the crankshaft 20 is rotated in a direction about drive axis 22, the first and second crossheads 30 and 64 are reciprocated along the pumping axis 38. As the crossheads are rigidly connected through the transfer rods 74, the crossheads move 180° out of phase of each other, i.e., as the first crosshead 30 begins its movement away from the drive axis 22, the second crosshead will begin its motion toward the drive axis 22 and so forth.

A first adapter assembly 76 is mounted on the power end 12 at the first crosshead 30. A first pony rod 78 is mounted at the end of the first crosshead 30 and passes into the first adapter 76 through a seal assembly 80. A first single acting pump 84 is, in turn, mounted at the end of the first adapter assembly 76. The pump 84 includes a pump piston 86, piston seal 87, a cylinder 88 in which the piston 86 reciprocates. The pumping chamber 90, shown only in part in FIG. 1, cooperates with inlet and outlet valves opening into the chamber. A piston rod 94 is secured at the end of the first pony rod 78 at one end and to the piston 86 at the opposite end. The rod 94 passes through a flush spray ring 96.

As will be apparent from FIG. 1, as the crankshaft 20 rotates to move crosshead 30 toward the drive axis 22 (toward the left in FIG. 1) the first pony rod 78, piston rod 94 and piston 86 will move in a similar direction, creating a relative vacuum in the pumping chamber 90, causing a slurry mixture or liquid to be drawn from the supply through the inlet valve. On the reciprocal motion as the first crosshead 30, pony rod 78, and piston 86 move away from the drive axis 22 (toward the right in FIG. 1) the slurry or fluid is pressurized and pumped from the chamber 90 through the outlet valve.

A second adapter assembly 100 is mounted on the power end 12 proximate the second crosshead 64. A second single acting pump 102 is similarly mounted at the end of the adapter assembly 100 opposite the power end 12. The elements of the adapter assembly 100 and pump 102 are identical to those previously described in assembly 76 and pump 84 and are therefore identified by identical reference numerals. However, it will be apparent that the pumping stroke of the piston 86 in the pump 102 will be 180° out of phase with the pumping stroke of the piston 86 in the pump 84.

The present invention permits simultaneous use of single acting pumps operated by a double acting drive mechanism. Thus, the higher efficiency and inherently longer life single acting type pump can be employed without sacrifice of utilization of the drive mechanism, as the drive mechanism is continuously loaded by one of the pumps. In conventional single acting pumps, the drive mechanism is essentially loaded for only one-half of each revolution, significantly reducing the efficiency of the entire assembly.

Single acting pumps have a number of advantages over a double acting pump. These advantages include the elimination of wear on piston rods and packing and also allows cylinder flushing. Another advantage is the avoidance of the difference in displacement for each direction of stroke of a double acting piston due to the presence of the piston rod on one side of the piston. The single acting pump permits atmospheric flush of the cylinder liner during the pumping stroke. Also, as the majority of stress occurs during the pumping stroke of the pumps 84 and 102, the load acting on the various pony and piston rods, the transfer rod 74 and the connecting rod 26 is in compression and these elements are not subject to stress reversals as would be encountered in operating double acting pumps.

Yet another advantage of the present invention is the potential for handling two different fluid streams simultaneously with a single pump assembly 10. For example, the pump 84 could be employed to pump slurry for the delivery of solids in one direction while the pump 102 is simultaneously pumping a carrier liquid (such as water) back to the slurry source. In addition, the pump assembly 10 can be run at half capacity by disconnecting the cross connection formed by transfer rod 74. This permits use of equipment designed for maximum capacity in an operation during startup when only half the capacity is necessary. Furthermore, the component structure of the assembly 10 can permit the use of different design adapters and pumps at either end of the power end 12 to readily adapt the pump assembly 10 to a specific application. Clearly, while only a single throw has been described on crankshaft 20, the crankshaft 20 can be provided with a number of throws where paired crossheads and single acting pumps are driven through each throw to increase the total capacity of the pump assembly 10.

Although a single embodiment of the invention has been illustrated in the accompanying Drawings and decribed in the foregoing Detailed Description, it will understood that the invention is not limited to the embodiment disclosed, but is capable of numerous rearrangements, modifications and substitutions of parts and elements without departing from the spirit of the invention.

We claim:

1. A pump assembly comprising:
   a frame;
   a crankshaft mounted for rotation in said frame about a drive axis;
   a connecting rod mounted on the crankshaft;
   a first crosshead pivotally mounted on the connecting rod, the frame having first crosshead guides for confining motion of the first crosshead along a first pumping direction as the crankshaft rotates about the drive axis;
   a second crosshead, the frame having second crosshead guides for confining motion of the second crosshead along the first pumping direction on the opposite side of the drive axis from the first crosshead;
   transfer structure connecting the first and second crossheads for joint motion along the first pumping direction;
   a first single acting pump, the first pump having a cylinder with its center axis aligned with the first pumping direction and a piston reciprocating within the cylinder, the piston and cylinder defining a pumping chamber, the piston connected to the first crosshead, movement of the first crosshead along the first pumping direction and away from the drive axis moving the piston within the cylinder to decrease the volume of the pumping chamber forming the working stroke of the first pump to pump slurry.
   a second single acting pump, the second pump having a cylinder with its center axis aligned with the first pumping direction and a piston reciprocating within the cylinder, the piston and cylinder defining a pumping chamber, the piston connected to the second crosshead, movement of the second crosshead along the first pumping direction away from the drive axis moving the piston within the cylinder to decrease the volume of the pumping chamber forming the working stroke of the second pump to pump slurry; and
   the working stroke of each of the pumps occurring in opposite directions of movement along the first pumping axis to provide a relatiely constant load on the crankshaft, connecting rod, crossheads and transfer structure, the pumping forces acting on the second crosshead to operate the second single acting pump being transferred from the first crosshead through the transfer structure, wherein said first and second crosshead guides include a pair of cradles having a wear surface thereon for engaging and guiding the crossheads and means for securing the cradles to the frame initially permitting limited movement of each of the cradles relative to the frame in a plane parallel the first pumping direction so that reciprocation of a crosshead along the first pumping direction by rotating the crankshaft aligns the cradles with the crossheads and subsequently rigidly securing the cradles to the frame in alignment with the crossheads.

2. A crosshead assembly for use in guiding a crosshead in a pump along an axis of reciprocation as the crosshead is reciprocated by a power unit, the crosshead having a bearing surface, comprising:
   a cradle having a bearing surface for contacting the bearing surface on the crosshead as it reciprocates;
   means for initially permitting limited movement of the cradle relative to the frame of the pump within a plane parallel the axis of reciprocation to align the cradle with the crosshead by reciprocating the crosshead through its range of motion and subsequently rigidly securing th cradle to the frame in the aligned position;
   said securing means including a plurality of fastening assemblies, each of said fastening assemblies including a bolt passing through an aperture in the cradle, the aperture being larger than the outer diameter of the bolt to provide the limited movement during alignment and a nut for torquing the bolt to rigidly secure the cradle to the frame.

3. The crosshead cradle assembly of claim 2 wherein said crosshead has opposed bearing surfaces with a convex shape, said crosshead cradle assembly including first and second cradles, each for contacting and guiding the crosshead at one of the opposed bearing surfaces on the crosshead.

* * * * *